(No Model.)
C. R. STEDMAN.
ROTARY MEASURE.
No. 579,244. Patented Mar. 23, 1897.
Fig. 1.
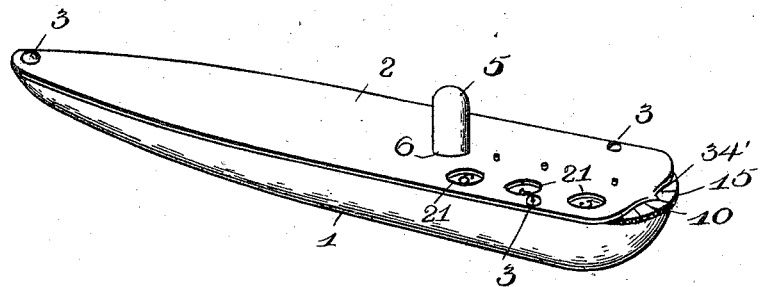
Fig. 2.
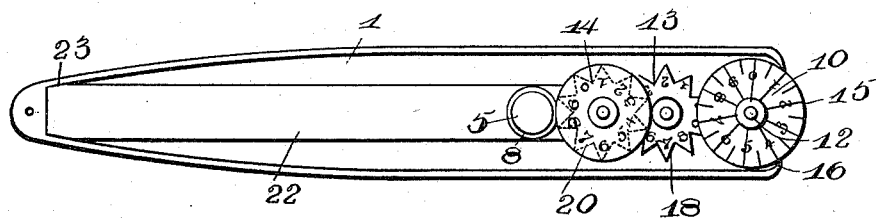
Fig. 3.
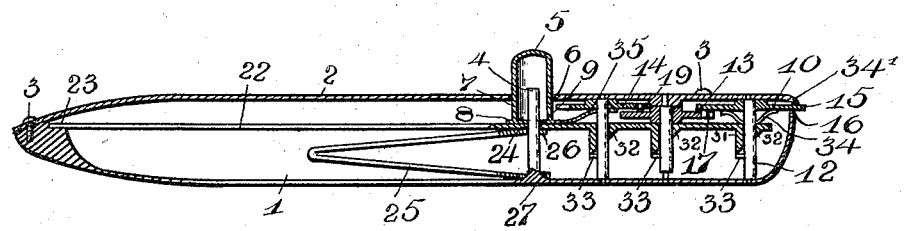
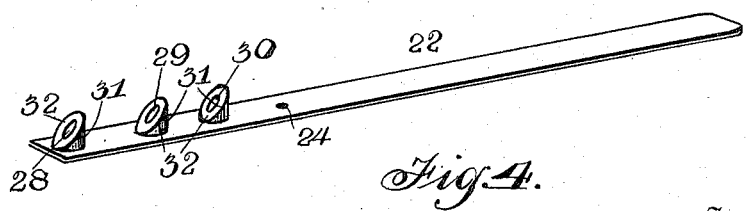
Fig. 4.
Witnesses
Wm. F. Doyle
N. B. Smith
Inventor
Charles R. Stedman
By H. B. Willson
Attorney

UNITED STATES PATENT OFFICE.

CHARLES R. STEDMAN, OF NORWALK, OHIO.

ROTARY MEASURE.

SPECIFICATION forming part of Letters Patent No. 579,244, dated March 23, 1897.

Application filed July 14, 1896. Serial No. 599,151. (No model.)

*To all whom it may concern:*

Be it known that I, CHARLES R. STEDMAN, a citizen of the United States, residing at Norwalk, in the county of Huron and State of Ohio, have invented certain new and useful Improvements in Measuring Instruments; and I do declare the following to be a full, clear, and exact description of the invention, such as will enable others skilled in the art to which it appertains to make and use the same.

My invention has relation to improvements in linear-measuring instruments in estimating and contracting; and the object is to provide a simple and reliable tool or instrument for this purpose that will be portable and convenient.

To this end the novelty consists in the construction, combination, and arrangement of the same, as will be hereinafter more fully described, and particularly pointed out in the claims.

In the accompanying drawings the same figures of reference indicate the same parts of the invention.

Figure 1 is a perspective view of my improved measure as it appears in use. Fig. 2 is a top plan view showing the cover-plate removed. Fig. 3 is a longitudinal section, and Fig. 4 is a perspective view of the unison-plate detached from the case.

1 represents the case, and 2 the cover-plate, removably secured thereto by screws 3.

4 is a standard secured in the bottom of the casing 1, which forms a guide for the push-button 5, the outer end of which projects through a circular orifice 6 in the plate 2, and its inner end is provided with a cap 7, having a flange 8 to prevent it sliding out of the orifice in the cover, and it is also formed with a guide-orifice 9, by means of which it slides freely on the standard 4.

10 is the "units-wheel," rigidly mounted on a shaft 12, having its ends journaled in the case and cover. The "tens-wheel" 13 and the "hundreds-wheel" 14 are similarly mounted. The milled rim 15 of the units-wheel 10 projects through a slot 16 in the end of the case 1, and said rim is made to travel over the line to be measured, one complete revolution of said wheel causing its pin 17 to engage one of the ten teeth 18 on the tens-wheel and rotate it one tooth. One revolution of the tens-wheel 13, or ten revolutions of the units-wheel 10, causes the pin 19 on the tens-wheel 13 to engage one of the ten teeth 20 on the hundreds-wheel 14 and rotate said wheel one tooth, after the usual manner of similar machine counters. The faces of the wheels are provided with the usual digits, which are conveniently read through the visual orifices 21 in the cover-plate.

The shaft of the tens-wheel 13 is formed with elongated pinions, which allow of a longitudinal movement of said shaft just sufficient to permit the pin 19 to be released from the plane of the teeth on the hundreds-wheel and at the same time remove its own teeth from the path of the teeth in the units-wheel 10 when the tens-wheel is pressed down by the action of the unison-plate. This operation disconnects all three of the wheels and leaves them free to be rotated or returned to unison by the unison-plate, as will be hereinafter described.

22 is a longitudinal unison-plate having one end secured in a recess 23 in one end of the case 1, and it is provided with a guide-hole 24, through which the standard 4 passes, and a V-shaped spring 25, the free ends of which are provided with guide-orifices 26 27, through which the standard passes, is located between said unison-plate and the bottom of the case, said spring pressing the plate upward and causing the push-button 5 to be normally projected beyond the plate 2. The free end of this plate 22 is provided with orifices 28, 29, and 30, through which the shafts of the index-wheels pass. Each of the orifices in the plate 22 is provided with an inwardly-projecting cylindrical flange 31, the inclined face 32 of which is normally out of contact with a radial pin 33 on each of the shafts of the index-wheels. After the instrument has been used, the index-wheels have been left at various points, and it is desired to return them to unison or the starting-point a simple pressure on the thumb-button 5 presses the unison-plate 22 inwardly. This causes the inclined face of the flanges 31 to engage the radial pins on the shafts of the index-wheels and rotate said shafts until the pins strike the highest points of the inclined face of said flanges, which point of course is so arranged as to present the zero-character or "0" to the visual orifices in the plate.

The radial pins on the shafts of the index-wheels are so arranged that they are never centered on the lowest point of the inclined flanges, but the pins are set a little out of line with the zero-mark, which would bring the pin a little in advance of the numeral "5," so that from "0" to "5" the unison-plate will return the wheels to "0," while from "5" to "0" they will be advanced to "0." In other words, the operation of the unison-plate will continue moving the wheels around the circle until they arrive at unison or "0."

In practice I prefer to use light flat tension-springs 34 35 under the units and hundreds wheels to produce enough friction and prevent their accidental movement or displacement when the instrument is in operation, the spring 25 under the unison-plate 22 serving the same purpose for the tens-wheel, and of course when the unison-plate 22 is pressed down the tension is relieved from all the wheels, so that they may be readily set.

To use the instrument, the milled rim of the units-wheel is placed on the line to be measured, estimated, or computed, with the pointer 34' on the cover-plate at the end of the line, and as the instrument is moved along, the rim of the units-wheel following the course of the line precisely until the pointer 34' reaches the end of the line, and as the drawings of architects and contractors are usually drawn on a scale of one-quarter of an inch to the foot and the diameter of the milled wheel in the present instance is equal to ten feet at the scale the drawings are usually made, it follows that the length of the line traversed can be instantly and correctly read on the dials or wheels 10, 13, and 14.

A number of lines, straight, curved, or irregular, may be measured one after the other and their sum read off, as indicated, and after the reading is noted a simple pressure of the push-button restores all the wheels to unison, ready for a new movement.

I do not desire to confine myself to the scale indicated, as it is obvious that the diameter or the circumference of the traversing wheel may be increased or diminished to conform to any scale desired.

Having thus fully described my invention, what I claim as new and useful, and desire to secure by Letters Patent of the United States, is—

1. The combination with the units-wheel 10 having the radial pin 33, and the pin 17, the tens-wheel 13 provided with circumferential teeth 18, a pin 19, and a radial pin 33, and the hundreds-wheel 14 provided with a series of teeth and a radial pin 33, of means substantially as described for restoring said wheels to unison, substantially as and for the purpose set forth.

2. The combination with the units and tens wheels provided with the radial pins 33, of the unison-plate 22 provided with the cylindrical flanges 31 having inclined faces 32, substantially as and for the purpose set forth.

3. The case 1 and cover 2 in which is mounted a series of registering-wheels substantially as described, the shafts of which are provided with unison-pins 33, in combination with the unison-plate 22, its spring 25 and push-button 5, and provided with guide-orifices 28, 29 and 30, having cylindrical flanges 31, the inclined faces 32 of which are adapted to engage the unison-pins 33 when operated by the push-button 5, as and for the purpose set forth.

In testimony whereof I hereunto affix my signature in presence of two witnesses.

CHARLES R. STEDMAN.

Witnesses:
  A. V. ANDREWS,
  HORACE ANDREWS.